Feb. 16, 1926.                                          1,573,393
                        C. GOLD ET AL
              COMBINED MIRROR AND COMPACT HOLDER
                    Filed June 2, 1925        2 Sheets-Sheet 1
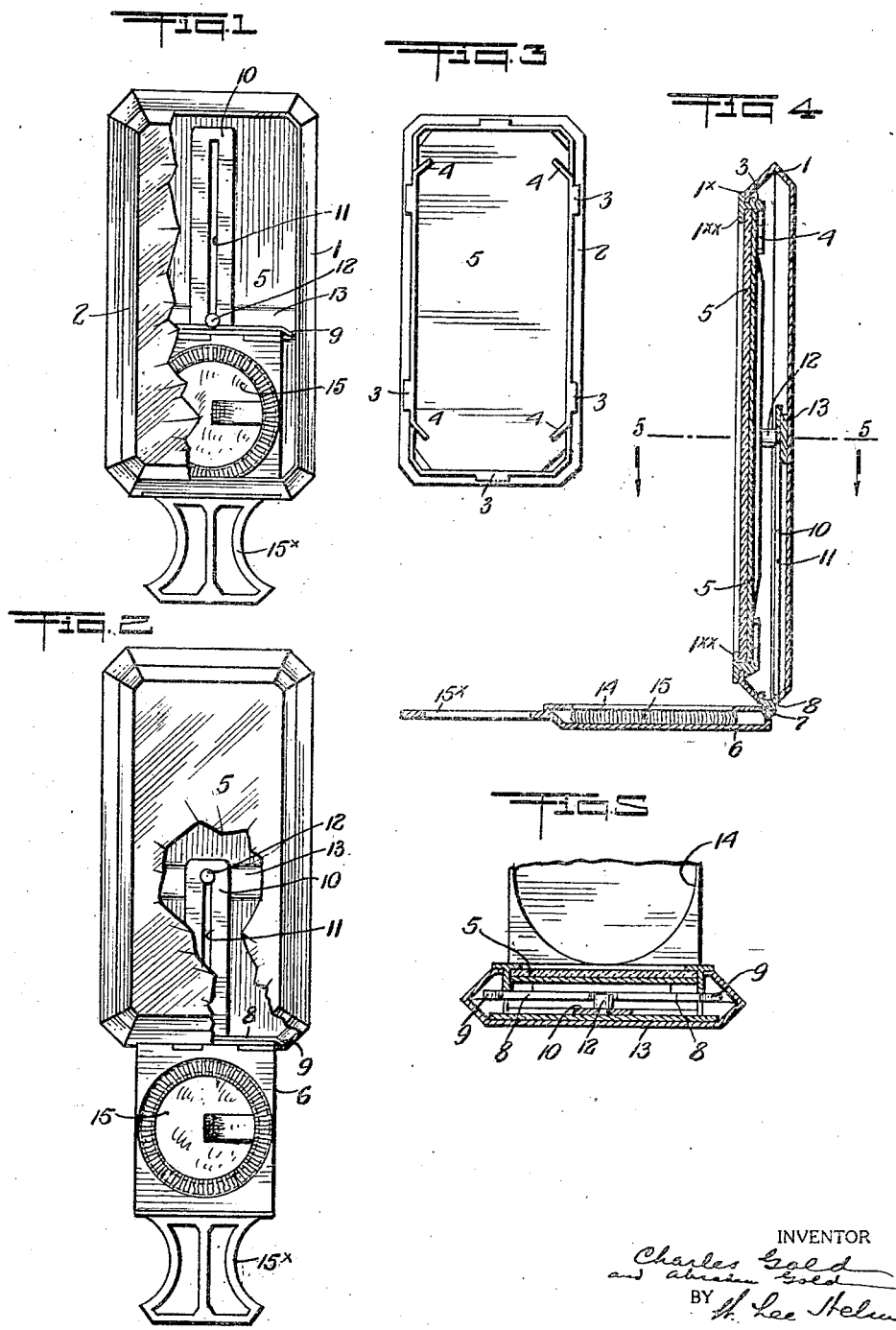
INVENTOR
Charles Gold
and Abraham Gold
BY
ATTORNEY Feb. 16, 1926.
C. GOLD ET AL
1,573,393
COMBINED MIRROR AND COMPACT HOLDER
Filed June 2, 1925    2 Sheets-Sheet 2
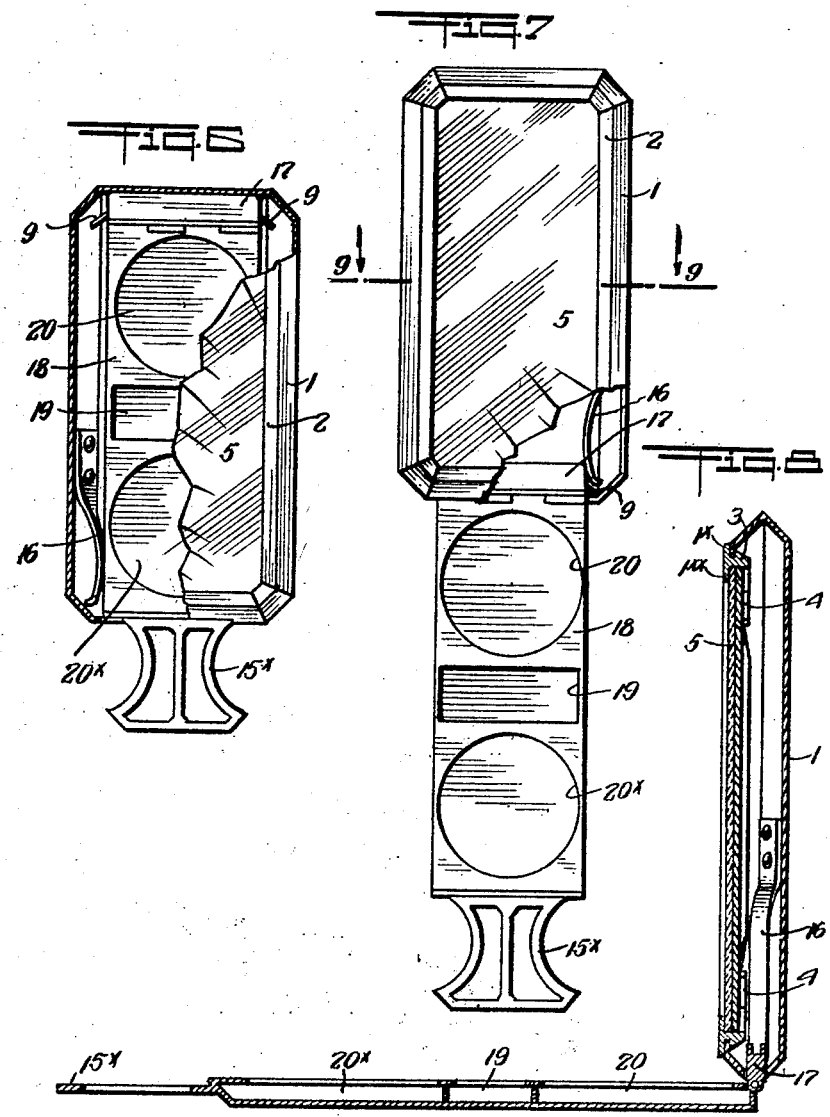
INVENTOR
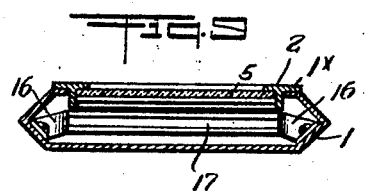
BY
ATTORNEY Patented Feb. 16, 1926.

1,573,393

UNITED STATES PATENT OFFICE.

CHARLES GOLD AND ABRAHAM GOLD, OF NEW YORK, N. Y., ASSIGNORS TO CHARLES GOLD & BROTHERS, A COPARTNERSHIP CONSISTING OF CHARLES GOLD, ABRAHAM GOLD, AND ISADORE FOGEL, OF NEW YORK, N. Y.

COMBINED MIRROR AND COMPACT HOLDER.

Application filed June 2, 1925. Serial No. 34,311.

*To all whom it may concern:*

Be it known that we, CHARLES GOLD and ABRAHAM GOLD, citizens of the United States of America, residing in New York, county and State of New York, have invented a new and useful Combined Mirror and Compact Holder, of which the following is a specification.

The object of the present invention is to provide a combined mirror and compact holder of a novel form in which the holder is provided with a handle and the handle is connected with a carrier for toilet articles such as powder in compact form, rouge and lipstick. The carrier is hingedly connected to a holding element for the mirror so that when the holder is held horizontally or substantially so during use, the mirror can be supported thereby at an angle so as to enable ready use of the mirror.

The invention will be understood by reference to the accompanying drawings in which—

Figure 1 is a plan view of an embodiment of the invention, the mirror being broken away to expose the sliding holder for a toilet article;

Figure 2 is a view similar to Figure 1, showing the holder in outer position;

Figure 3 is a plan view of the rear face of the mirror frame and mirror held therein;

Figure 4 is a longitudinal section of the device, somewhat enlarged, showing it in position for use;

Figure 5 is a transverse section, looking in the direction of the arrows, on 5—5, Figure 4;

Figure 6 is a plan view of a somewhat modified form of the device, the mirror being broken away to expose the sliding holder for a plurality of toilet articles;

Figure 7 is a view similar to Figure 6, showing the sliding holder in outer position;

Figure 8 is a longitudinal section of the device illustrated in Figures 6 and 7, the same being in position for use, the said figure being enlarged, and Figure 9 is a cross section on the line 9—9, Figure 7, looking in the direction of the arrows.

Referring to Figure 1, it will be seen that the device comprises a casing 1 which in this instance is somewhat rectangular in form and has bevelled sides. The casing 1 is open at the top and its spring-like marginal edges 1˟ are adapted to hold mirror frame 2, the latter having wedge shaped catches 3, each catch being formed with a recess, shown in Figure 4, into which the marginal edge 1˟ of said casing 1 will spring when the mirror frame is pressed downwardly into position. Mirror frame 2 is provided with lips 4, which are adapted to be bent over rearwardly of the mirror 5 to hold the same in position and against shoulders 1˟˟ of the mirror frame. When the mirror frame, with the mirror therein, is assembled with the case 1, a compartment is formed which is closed except at its front end, and slidably movable through said open front end is a holder 6 pivotally connected at 7 with a cross member 8 having marginal stops 9 which limit its forward movement. Holder 6 is guided in its movements by a guide plate 10, havng a central slot 11 through which passes a headed pin 12. Guide plate 10 is preferably of spring metal and is rigidly connected to cross bar 8 and thence is slightly sprung upwardly over a rest member 13 on the inner wall of casing 1, so that it has a frictional pressure upon the headed pin 12. The guide plate 10 thus not only serves to guide holder 6 in its movements, but also to hold bar 8 firmly in outer position. When the casing is moved upwardly to the position shown in Figure 4, both the holder 6 and the mirror are placed in their proper positions for use. The holder 6 is provided in its top with an aperture 14 to receive a powder or other compact in the space below it. The figure shows a puff 15 placed in position and it will be understood that the compact of powder or other material will normally lie under the puff. The holder 6 may have attached thereto a handle 15.

Referring to Figures 6 to 9 inclusive, it will be seen that the device therein illustrated is the same in principle as that illustrated in the preceding figures with the exception that the holder for the toilet articles is adapted for a plurality of articles and the means for guiding the holder within the casing is specifically different.

The casing illustrated in Figures 6 to 9 inclusive is the same as that illustrated in the preceding figures with the exception that the rest member 13 is omitted and two spring members 16 are applied to opposite sides of the casing toward the front end thereof. The holder is pivoted to a cross bar member 17, which member is larger than the corresponding member shown in the Figures 1 to 5 inclusive, so that when the bar is moved forwardly to the position illustrated in Figure 7 spring 16 will be given an adequate surface upon which to bear.

The holder 18 is formed with an intermediate rectangular chamber 19 for a lipstick and on each side thereof are circular chambers 20, 20× for powder and rouge. When the holder is moved inwardly, the bar is carried to the extreme rear end of the casing 1 and the frictional pressure of springs 16 upon the sides of the holder serves to maintain the latter in position. A handle 15× may be attached to the holder if desired.

Having described our invention what we claim and desire to secure by Letters Patent is as follows:

1. A vanity case comprising a casing, a bar adapted to slide bodily from one point to another within the casing, a holder pivotally connected to the bar, means for guiding the bar and holder in their movements within the casing, the device being such that when the holder is moved to outer position it may be swung to angular position relatively to the casing.

2. A vanity case comprising a casing having a marginal opening therein, a holder movable through said opening, a supporting member hingedly connected to the holder whereby the latter may be swung to an angle relatively to the casing, a mirror held by the casing, a spring device within the casing and serving to guide the holder in its movements, and means provided in the holder for receiving compact toilet articles.

In testimony whereof, we have signed our names to this specification.

CHARLES GOLD.
ABRAHAM GOLD.